(12) United States Patent
Funabiki et al.

(10) Patent No.: US 8,254,929 B2
(45) Date of Patent: Aug. 28, 2012

(54) MOBILE COMMUNICATION METHOD AND MOBILE COMMUNICATION APPARATUS

(75) Inventors: Makoto Funabiki, Osaka (JP); Shinkichi Ikeda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 734 days.

(21) Appl. No.: 12/364,751

(22) Filed: Feb. 3, 2009

(65) Prior Publication Data

US 2009/0141686 A1 Jun. 4, 2009

Related U.S. Application Data

(63) Continuation of application No. 10/557,811, filed on Nov. 22, 2005, now Pat. No. 7,505,770.

(30) Foreign Application Priority Data

Nov. 4, 2003 (JP) ................................. 2003-374147
Oct. 29, 2004 (JP) ................................. 2004-315472

(51) Int. Cl.
*H04B 1/16* (2006.01)
*H04W 4/00* (2009.01)
*H04W 40/00* (2009.01)
*H04M 1/00* (2006.01)
*G06F 15/173* (2006.01)

(52) U.S. Cl. .................. 455/436; 455/552.1; 455/435.3; 455/445; 455/433; 370/331; 370/338; 709/238

(58) Field of Classification Search .................. 455/436, 455/552.1, 435.3, 445, 433; 370/331, 338; 709/238

See application file for complete search history.

(56) References Cited

U.S. PATENT DOCUMENTS

| 6,223,046 | B1 | 4/2001 | Hamill-Keays et al. |
| 6,466,964 | B1 | 10/2002 | Leung et al. |
| 6,578,085 | B1 | 6/2003 | Khalil et al. |
| 2003/0016655 | A1 | 1/2003 | Gwon |
| 2003/0018810 | A1 | 1/2003 | Karagiannis et al. |
| 2003/0131047 | A1* | 7/2003 | Takeyoshi et al. ............ 709/202 |
| 2003/0169719 | A1 | 9/2003 | Isobe et al. |
| 2004/0013099 | A1 | 1/2004 | O'Neill |
| 2004/0098507 | A1 | 5/2004 | Thubert et al. |
| 2004/0100951 | A1 | 5/2004 | O'Neill |

(Continued)

FOREIGN PATENT DOCUMENTS

EP 04 79 9596 4/2011

(Continued)

OTHER PUBLICATIONS

Rajeev Koodli, Fast Handovers for Mobile IPv6 IETF Dravt V 6.00, Oct. 10, 2003, Nokia Research Center.*

(Continued)

*Primary Examiner* — Ariel Balaoing
(74) *Attorney, Agent, or Firm* — RatnerPrestia

(57) ABSTRACT

A mobile communication apparatus includes a registration request part (47) requesting a correspondent node to make location registration, a BU list memory (45) keeping a list of the correspondent nodes which have made the location registration, a handover detection part (41) detecting the start of a handover, and a registration cancellation processing part (46) canceling the location registration of the correspondent nodes in the BU list, upon notification of start of handover by the handover detection part (41), thereby reducing loss of packets transmitted from the correspondent nodes during the handover, because the route optimization applied to the correspondent nodes registered in the BU list at the start of the handover is canceled by requesting the cancellation to the correspondent nodes.

7 Claims, 7 Drawing Sheets

U.S. PATENT DOCUMENTS

2004/0228303 A1   11/2004   Kelly et al.

FOREIGN PATENT DOCUMENTS

| | | |
|---|---|---|
| EP | 04 799 596.4 | 7/2011 |
| JP | 2001-144811 | 5/2001 |
| JP | 2002-281069 | 9/2002 |
| JP | 2003-047037 | 2/2003 |
| JP | 2003-209873 | 7/2003 |
| JP | 2003-209890 | 7/2003 |
| JP | 2003-209890 A | 7/2003 |
| JP | 2003-249951 | 9/2003 |
| WO | WO 03/088622 A1 | 10/2003 |

OTHER PUBLICATIONS

International Search Report corresponding to International Application No. PCT/JP2004/016702 dated Mar. 1, 2005.

David B. Johnson, et al., Mobility Support in IPv6, IETF RFC3775, The Internet Society, dated Jun. 2004.

Hosei Matsuoka et al., "A Robust Method for Soft IP Handover", Mar. 1, 2003, pp. 18-24, vol. 7, No. 2, IEEE Computer Society, IEEE Internet Computing, IEEE Service Center, New York, NY, US.

Rajeev Koodli et al., "Fast Handovers and Context Transfers in Mobile Networks", Oct. 1, 2001, pp. 37-47, vol. 31, No. 5, Computer Communication Review, ACM, New York, NY, US.

* cited by examiner

FIG. 4

| ADDRESS OF TRANSMISSION DESTINATION OF BU | HOME ADDRESS | CARE-OF ADDRESS | SEQUENCE NUMBER | ... | REGISTRATION CANCELLATION PROCESSING FLAG | PRIORITY |
|---|---|---|---|---|---|---|
| 1:2:3:4:5:6:7:1 | 1:2:3:4:5:6:7:8 | 1:2:5:4:a:b:c:d | 123 | ... | OFF | 0 |
| 1:2:3:6:5:6:7:8 | 1:2:3:4:5:6:7:8 | 1:2:5:4:a:b:c:d | 124 | ... | ON | 1 |
| ... | ... | ... | ... | ... | ... | ... |
| 1:2:3:7:5:6:7:8 | 1:2:3:4:5:6:7:8 | 1:2:5:4:a:b:c:d | 130 | ... | OFF | 5 |

1101 1102 1103 1104 1105 1106

MOBILE COMMUNICATION METHOD AND MOBILE COMMUNICATION APPARATUS

This application is a continuation of U.S. patent application Ser. No. 10/557,811, filed Nov. 22, 2005, which is incorporated herein by reference.

TECHNICAL FIELD

This invention relates to a mobile communication method and a mobile communication apparatus using an internet protocol.

BACKGROUND ART

As a conventional mobile communication method using an internet protocol, the one using Mobile IPv6 which is disclosed in "Mobility Support in IPv6", IETF RFC3775 written by David B. Johnson et al. is known.

The operation of the conventional Mobile IPv6 will be explained with reference to a sequence diagram of FIG. 7. Note that black circles in the drawing indicate routing nodes.

First of all, a mobile communication apparatus MN holds a home address (hereinafter, referred to as HoA) which will not change with movement, and is connected to an access router (hereinafter, referred to as OAR). It receives data packets through the OAR (step S700).

The mobile communication apparatus moves to another access router (hereinafter, referred to as NAR) from this state, and generates a care-of address (hereinafter, referred to as CoA) based on a subnet prefix included in a router advertisement (hereinafter, referred to as RA) message (step S701) received from the NAR after a handover in a data link layer is finished (step S702).

Next, the mobile communication apparatus MN sends a binding update (hereinafter, referred to as BU) message including HoA and CoA to a home agent HA (step S703).

The home agent HA, after receiving the BU message from the mobile communication apparatus MN, in the case that there exists an entry which corresponds to the HoA included in the received BU message in a binding cache stored by the home agent HA itself, updates the entry. In the case that there does not exist a corresponding entry, a new entry is generated. After that, the home agent HA sends to the mobile communication apparatus MN a binding acknowledgement (hereinafter, referred to as BA) message indicating that a registration is completed (step S704).

Next, the mobile communication apparatus MN confirms that the registration is completed by receiving the BA message. According to the above, packets sent addressed to the HoA of the mobile communication apparatus MN are intercepted by the home agent HA and tunneled to the CoA of the mobile communication apparatus MN.

However, in these standard operations of Mobile IPv6, all packets addressed to the HoA of the mobile communication apparatus MN are routed via the home agent HA; therefore, the route will be redundant.

Therefore, in Mobile IPv6, a route optimization procedure which allows packets to be directly transmitted to the mobile communication apparatus MN without routing via the home agent HA is prescribed as an optional feature. In the route optimization procedure, the mobile communication apparatus MN, after the registration to the home agent HA as the standard operation has been completed, sends the BU message including the HoA and CoA to the correspondent node CN with which the apparatus currently communicates (step S706). Or, when a received packet is tunneled by the home agent HA, the BU message including HoA and CoA is sent to the correspondent node CN which is the transmission origin and is the node with which communication is to be made.

Next, the correspondent node CN which has received the BU message from the mobile communication apparatus MN updates or generates the entry concerning the HoA of the mobile communication apparatus MN in the binding cache in the same way as the home agent HA. In the case of performing a registration processing to the correspondent node CN, a procedure for securing security (step S705) might be performed.

According to the above operation, the correspondent node CN can forward a packet directly to the mobile communication apparatus MN without sending the packet to the corresponding care-of address and thus being routed via the home agent HA, because there exists a destination address of the transmission packet in the binding cache (step S707).

According to the route optimization procedure, packet transmission delay can be made small, which is effective when performing close-to-real-time communication. For example, when an application to be used requires the real-time communication, there is a method of decreasing the packet delay by executing the route optimization procedure as disclosed in JP-A-2001-144811.

However, in the conventional structure, when the mobile communication apparatus moves to another access router while communicating with the correspondent node with the route optimization performed, the apparatus starts a location registration to the correspondent node after the location registration with respect to the home agent has been completed, and therefore, packets transmitted to the care-of address of the mobile communication apparatus during the registration are transmitted to the care-of address before the movement, so that there is a problem that packet loss occurs.

DISCLOSURE OF THE INVENTION

An object of the invention is to provide a mobile communication apparatus which reduces packet loss during a handover.

A mobile communication method of the invention includes a step that a mobile communication apparatus performs a location registration to a home agent managing the movement of the mobile communication apparatus through an access router connecting to the same sub-network, a step that the mobile communication apparatus performs the location registration to a correspondent node connected to different sub-network, a step that the mobile communication apparatus directly performs communication with the correspondent node, a step that the mobile communication apparatus detects the start of handover, and a step that the mobile communication apparatus instructs the cancellation of location registration to the correspondent node on receipt of the detection of the start of the handover. According to the steps, packets transmitted from the correspondent node are routed via the home agent, and when the mobile communication apparatus is performing the location registration, packets transmitted from the correspondent node to the home agent begin to be forwarded to the new location of the mobile communication apparatus, and therefore, packet loss at the time of handover can be reduced.

A mobile communication apparatus of the invention keeps a list in which addresses and other information of the correspondent nodes to which a location registration request has been performed in the past are entered, and gives notice of the cancellation of location registration to all correspondent nodes written in the list. Accordingly, packet loss of packets transmitted from all correspondent nodes can be reduced.

Further, the mobile communication apparatus of the invention keeps a list in which addresses and other information of the correspondent nodes to which the location registration request has been performed in the past are entered, and gives notice of the cancellation of location registration to those correspondent nodes written in the list which satisfy a prescribed condition. Accordingly, the registration cancellation processing is performed only to the correspondent nodes which satisfy the prescribed condition, and therefore the increase of traffic caused by registration cancellation messages is suppressed.

Further, the mobile communication apparatus of the invention keeps the list in which addresses and other information of the correspondent nodes to which the location registration request have been performed in the past are entered, sets a flag ordering the transmission of the registration cancellation message of the correspondent nodes which satisfy the prescribed condition in the entries of those correspondent nodes written in the list, and transmits the registration cancellation message to the correspondent nodes to which the flag is set. Accordingly, the mobile communication apparatus can determine where to transmit the registration cancellation message by referring to the flags.

A prescribed condition for selecting correspondent nodes in the invention is that the frequency of communication between the mobile communication apparatus and the correspondent node is high. Accordingly, packet loss from a correspondent node having high frequency of communication with the mobile communication apparatus can be reduced.

Another prescribed condition for selecting correspondent nodes in the mobile communication method according to the invention is that a session is established between the mobile communication apparatus and the correspondent node. Accordingly, a disconnection of the session with the correspondent node caused by packet loss can be prevented.

Still another prescribed condition for selecting correspondent nodes in the mobile communication method according to the invention is that an application using communication between the mobile communication apparatus and the correspondent node is inoperable when there is packet loss. Accordingly, an application that is inoperable when there is packet loss is usable even at the time of handover.

In the mobile communication method according to the invention, the mobile communication apparatus keeps the list in which addresses and other information of the correspondent nodes to which the location registration request has performed in the past are entered, and notifies the cancellation of location registration to correspondent nodes written in the list in the order of high priority. Accordingly, when there is insufficient time for sending the registration cancellation message to all correspondent nodes there is a good possibility that the registration cancellation processing can be performed to the correspondent nodes whose priority is high.

The priority in the correspondent nodes in the mobile communication method according to the invention is given to those with high frequency of communication with the mobile communication apparatus. Accordingly, packet loss from the correspondent nodes having high frequency of communication with the mobile communication apparatus can be reduced.

The mobile communication apparatus in the mobile communication method according to the invention further includes a step of giving priority to the correspondent nodes whose location registration in the list entry has not yet been cancelled, and giving the location registration request to such correspondent nodes after moving to a different subnetwork. Accordingly, packet loss from the correspondent nodes to which the registration cancellation message was not sent can be reduced.

A mobile communication apparatus of the invention includes a registration request part requesting a correspondent node to make a location registration, a list storage part keeping a list of the correspondent nodes to which the location registration has been performed, a handover detection part detecting the start of a handover and a registration cancellation processing part performing the cancellation of location registration of the correspondent nodes in the list upon notification from the handover detection part. Accordingly, the mobile communication apparatus can know the correspondent nodes to which a registration cancellation message should be sent by referring the list.

In addition, the list of the mobile communication apparatus according to the invention is the one in which registration cancellation information is added to a binding update list. Accordingly, it is not necessary that the mobile communication apparatus make and keep a new list.

The mobile communication apparatus of the invention further includes priority information indicating the order in which the registration cancellation shall be performed. Accordingly, the mobile communication apparatus can easily know the priority.

Further, in the mobile communication apparatus of the invention, the correspondent nodes are listed in the order of high priority. Accordingly, the mobile communication apparatus can know the priority without keeping a category field in the list indicating priority.

The cancellation of location registration in the mobile communication apparatus according to the invention is performed in the order of high frequency of communication between the mobile communication apparatus and the correspondent node. Accordingly, the registration cancellation processing can be performed first for those nodes with high possibility of packet loss, and therefore packet loss can be reduced efficiently.

The cancellation of location registration in the mobile communication apparatus according to the invention is performed giving priority to correspondent nodes where a session has been established with the mobile communication apparatus. Accordingly, the registration cancellation processing can be performed first for those nodes with high possibility that the session will be disconnected due to the occurrence of packet loss, and therefore packet loss can be reduced efficiently.

The cancellation of location registration in the mobile communication apparatus according to the invention is performed in the case that an application using communication between the mobile communication apparatus and the correspondent node is inoperable when there is packet loss. Accordingly, the registration cancellation processing can be performed first for the applications that would suffer great inconvenience by the occurrence of packet loss, and therefore packet loss can be reduced efficiently.

The mobile communication method according to the invention further includes a step of determining whether the connected access router performs handover processing using a fast mobile IP or not, and in the case it is determined that handover processing using the fast mobile IP is performed, the request for cancellation of location registration is not given to the communication nodes which have performed location registration in the past. Accordingly, unnecessary processing, which performs the registration cancellation of communication nodes even though packet loss will not occur because the fast mobile IP is applied, can be avoided.

The mobile communication apparatus according to the invention further includes a fast mobile IP detection part detecting that a connecting access router performs handover processing using a fast mobile IP, and when the fast mobile IP detection part detects the performance of the fast mobile IP, the detection part instructs the registration cancellation processing part not to request the communication nodes to cancel location registration. Accordingly, unnecessary processing, which performs the registration cancellation of the communication nodes even though packet loss will not occur because the fast mobile IP is applied, can be avoided.

As described above, according to the invention, packet loss occurring when the handover is performed by a mobile communication apparatus in the route optimization state can be reduced.

BRIEF DESCRIPTION OF THE DRAWINGS

FIG. 4 is a configuration chart of a binding-update list according to Embodiment 1 and Embodiment 2 of the invention;

BEST MODE FOR CARRYING OUT THE INVENTION

Hereinafter, an embodiment of the invention will be explained with reference to the drawings.
(Embodiment 1)

Figure 1:
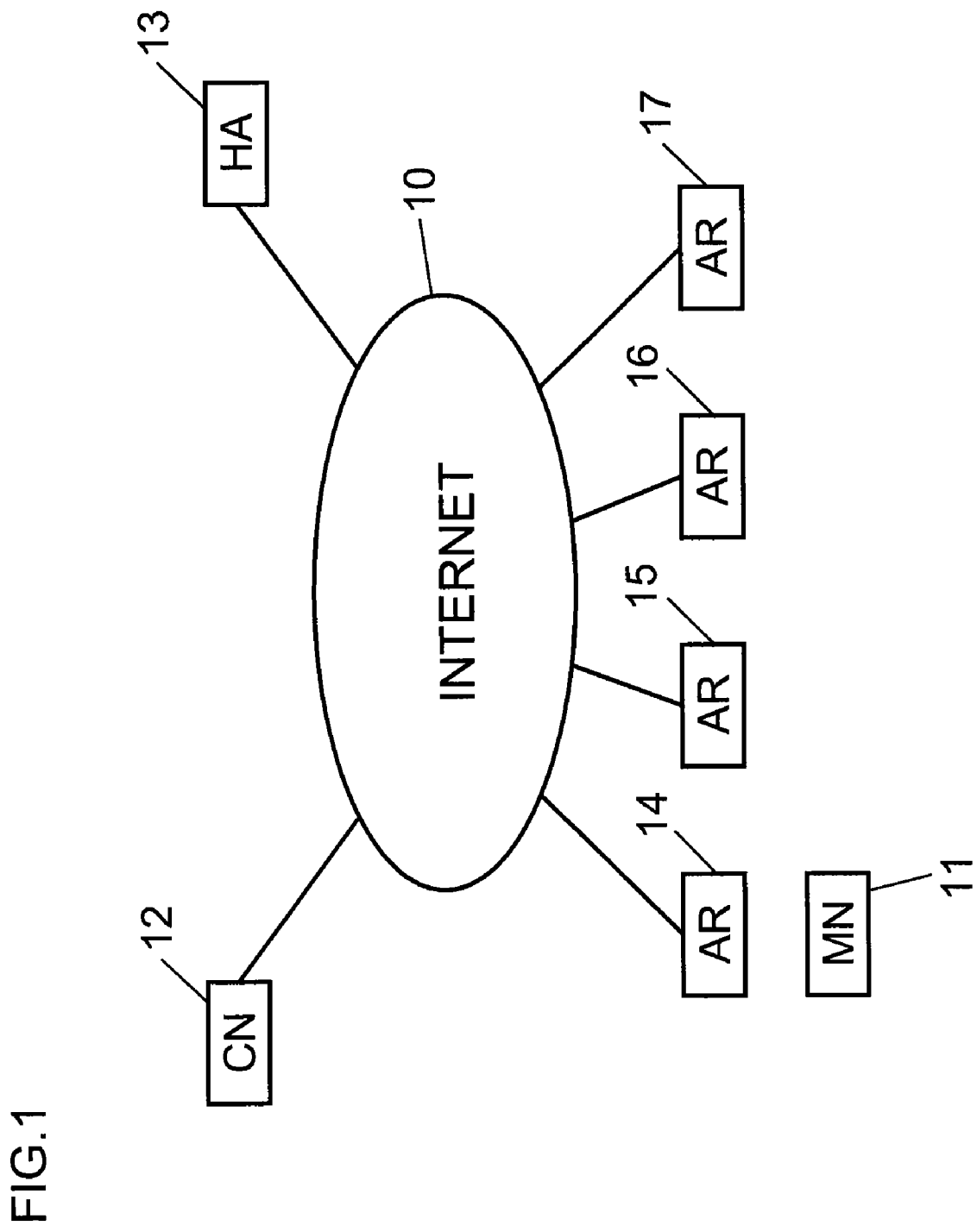
FIG. 1 is a configuration view of a mobile communication system according to Embodiment 1 of the invention.

FIG. 1 is a configuration view of a mobile communication system according to Embodiment 1 of the invention. In FIG. 1, Internet 10 includes a plurality of routers forwarding packets using an Internet protocol, a mobile communication apparatus MN11 includes not less than one wireless interface or not less than one wired interface, and a correspondent node CN12 communicates with the mobile communication apparatus 11. A home agent HA13 performs location management of the mobile communication apparatus 11, access routers AR14 to 17 are connected to the Internet with a wireless interface or a wired interface. Here, a configuration diagram of the mobile communication apparatus MN11 is shown in FIG. 2.

Figure 2:
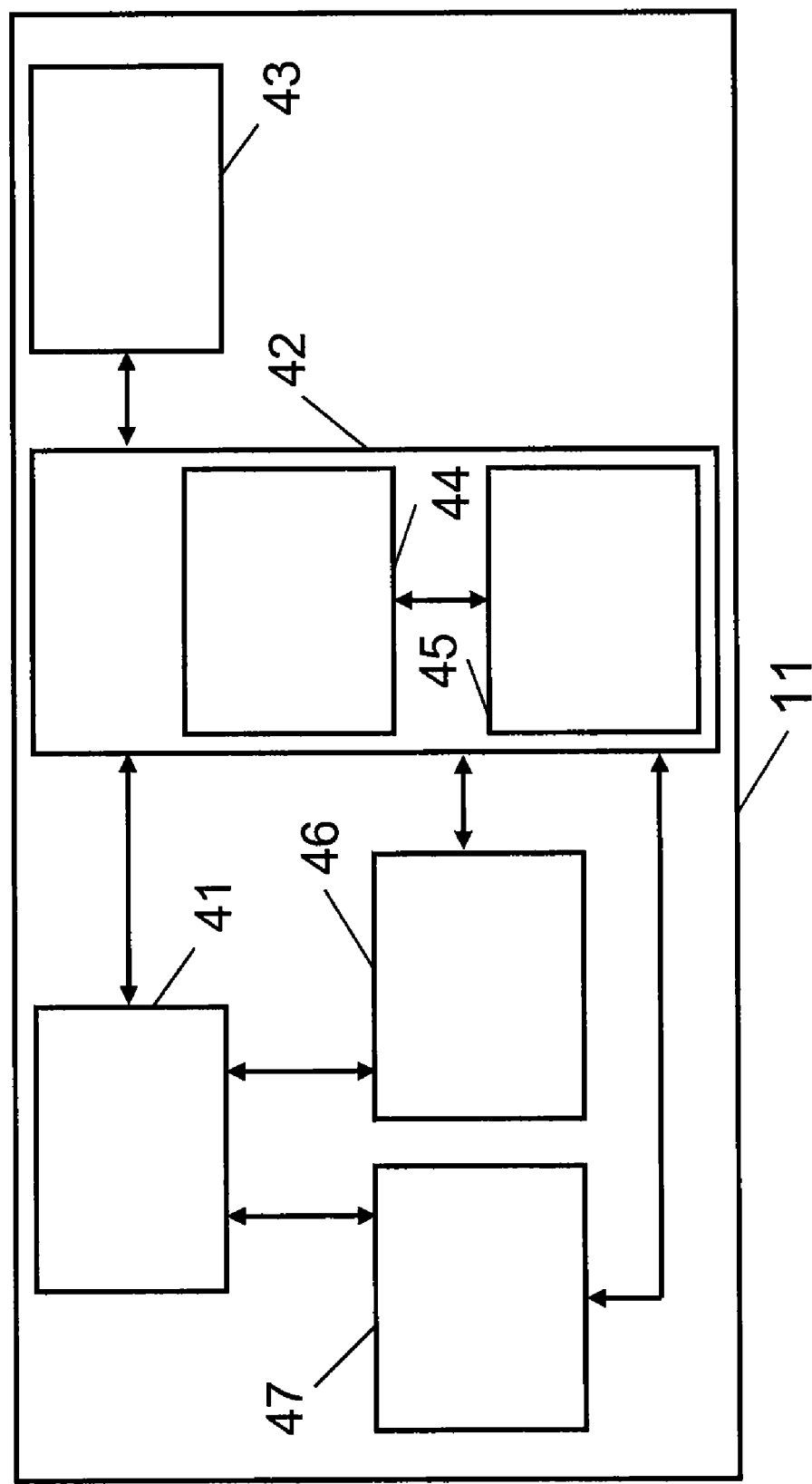
FIG. 2 is a configuration diagram of a mobile communication apparatus according to Embodiment 1 of the invention.

In FIG. 2, the mobile communication apparatus 11 includes a lower layer processing part 41 performing the lower layer processing such as modulation, demodulation and access control, an IP processing part 42 performing an IP layer processing, an upper layer processing part 43 performing a session management and application control, a registration cancellation processing part 46 receiving a trigger from the lower layer processing part and starting a registration cancellation processing, and a registration request part 47 requesting the correspondent node 12 or the home agent to register a location. Further, the IP processing part 42 has a mobile IP processing part 44 performing a processing of a mobile IP and a BU list memory 45 storing a binding update (BU) list in which addresses and other information of nodes to which BU messages have been sent are written. In FIG. 2, the registration cancellation processing part 46 and the registration request part 47 are separated from the IP processing part 42, but these parts may be included in the IP processing part 42. Additionally, the lower layer processing part 41 includes a handover detection part, and the BU list memory 45 corresponds to a list storage part.

A configuration of the BU list is shown in FIG. 4.

In FIG. 4, the BU list includes the transmission destination address of the BU message 1101, the home address set in the BU message 1102, the care-of address set in the BU message 1103, the sequence number of the BU message 1104, a registration cancellation processing flag 1105 indicating whether the registration cancellation processing shall be performed or not, a priority degree 1106 indicating a degree of priority of performing the registration cancellation processing, and the like.

The registration cancellation processing flag 1105 is set by the mobile communication node MN11, based on the communication status with the correspondent nodes included in the BU list 45. For example, when a TCP session is started with the correspondent node, the registration cancellation processing flag 1105 is set to ON, and when the TCP session is completed, it is set to OFF. It is also possible that the registration cancellation processing flag 1105 is set based on the frequency of communication with the correspondent nodes in the past. For example, in the case that the frequency of communication is high, the registration cancellation processing flag is set. Further, it is possible that the registration cancellation processing flag 1105 is set based on the kind of application used with the correspondent nodes in the past. For example, in the case of using the application that is inoperable when there is packet loss such as a file forwarding, the registration cancellation processing flag 1105 is set so as to perform the registration cancellation processing. Further, when the access router before movement and the access router at the movement destination support a fast mobile IP (indicated in "Fast Handovers for Mobile IPv6", an Internet draft under preparation by IETF), the registration cancellation processing flag 1105 is set to OFF. This is because packet loss does not occur when the fast mobile IP is applied and there is no necessity of performing the registration cancellation. Here, whether the access router apparatus of the movement origin supports the fast mobile IP or not can be determined by the value of a code field in a handover capability option added to a router advertisement message. Or, in the case that there is no response to a proxy router solicitation message transmitted by the mobile communication apparatus, it can be determined that the access router apparatus of the movement origin does not support the fast mobile IP. Additionally, the flag can be set in consideration of plural conditions. Note that a fast mobile IP detection part according to the invention is included in the mobile IP processing part 44, and instructs the registration request part 47 not to require corresponding communication nodes to cancel registration by changing the registration cancellation processing flag 1105 of the BU list memory 45 to be OFF.

The priority 1106 is set based on the status of communication with respective correspondent nodes included in the BU list 45. For example, the priority 1106 of a correspondent node is set higher where there is higher frequency of communication with that correspondent node.

The operation and effect of the mobile communication apparatus 11 constituted as above will be explained as follows.

Figure 3:
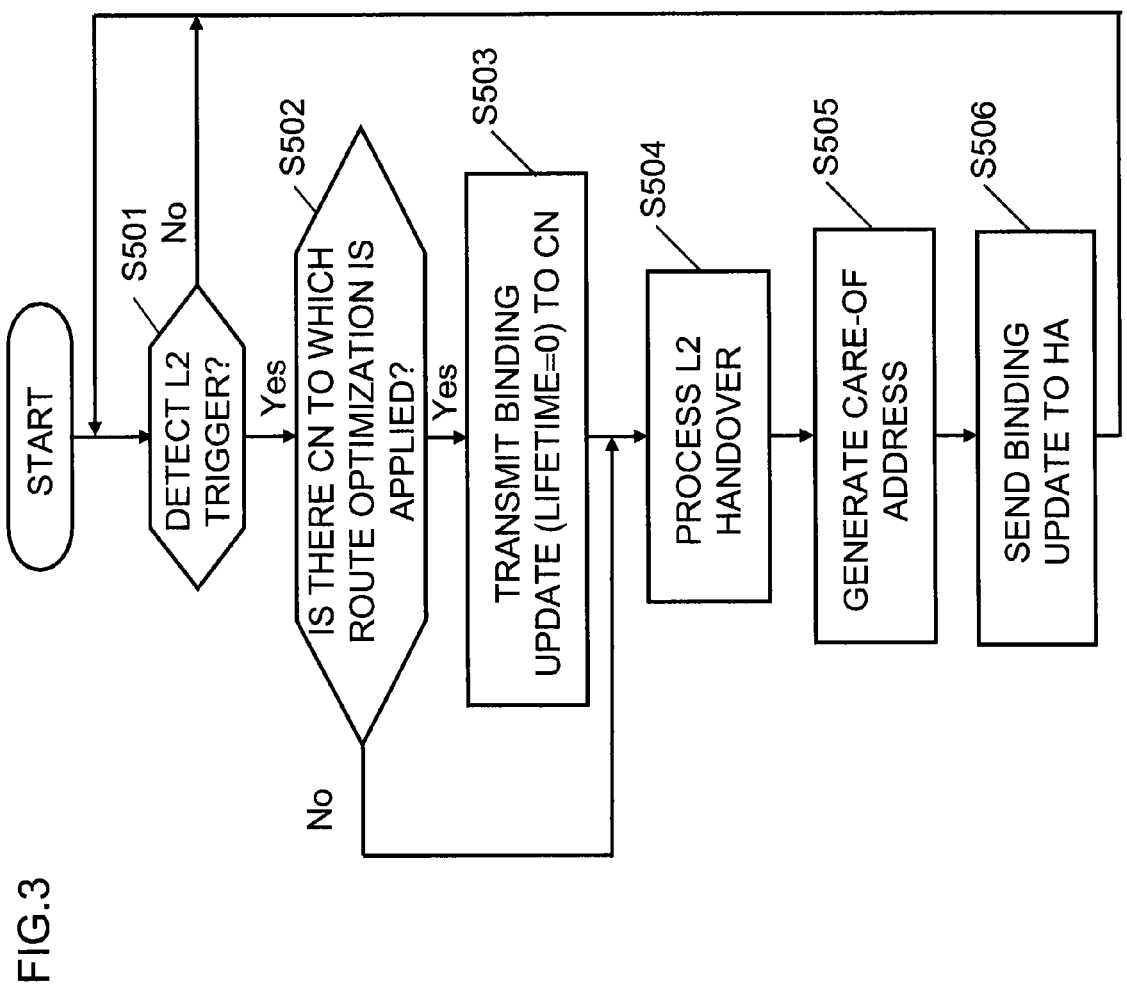
FIG. 3 is a flow chart showing an operation of the mobile communication apparatus according to Embodiment 1 of the invention.

FIG. 3 is a flow chart showing the operation of the mobile communication apparatus when a handover takes place.

First, the lower layer processing part 41 checks whether a L2 trigger has been detected (step S501). In the case that the lower layer processing part 41 is "IEEE802.11", a beacon signal is used for the trigger.

When the L2 trigger is detected from an AR 15, the mobile IP processing part 44 determines that the access router AR15 shall be the handover destination. Then, the registration cancellation processing part 46 refers to the stored BU list 45 and performs the registration cancellation processing with respect to the correspondent node CN12 whose entry exists in the BU list 45. In short, the registration cancellation processing part 46 determines whether there is a CN to which route optimization is applied or not in the BU list 45 (step S502), and if there is no such CN, operation proceeds to step S504.

Figure 6:
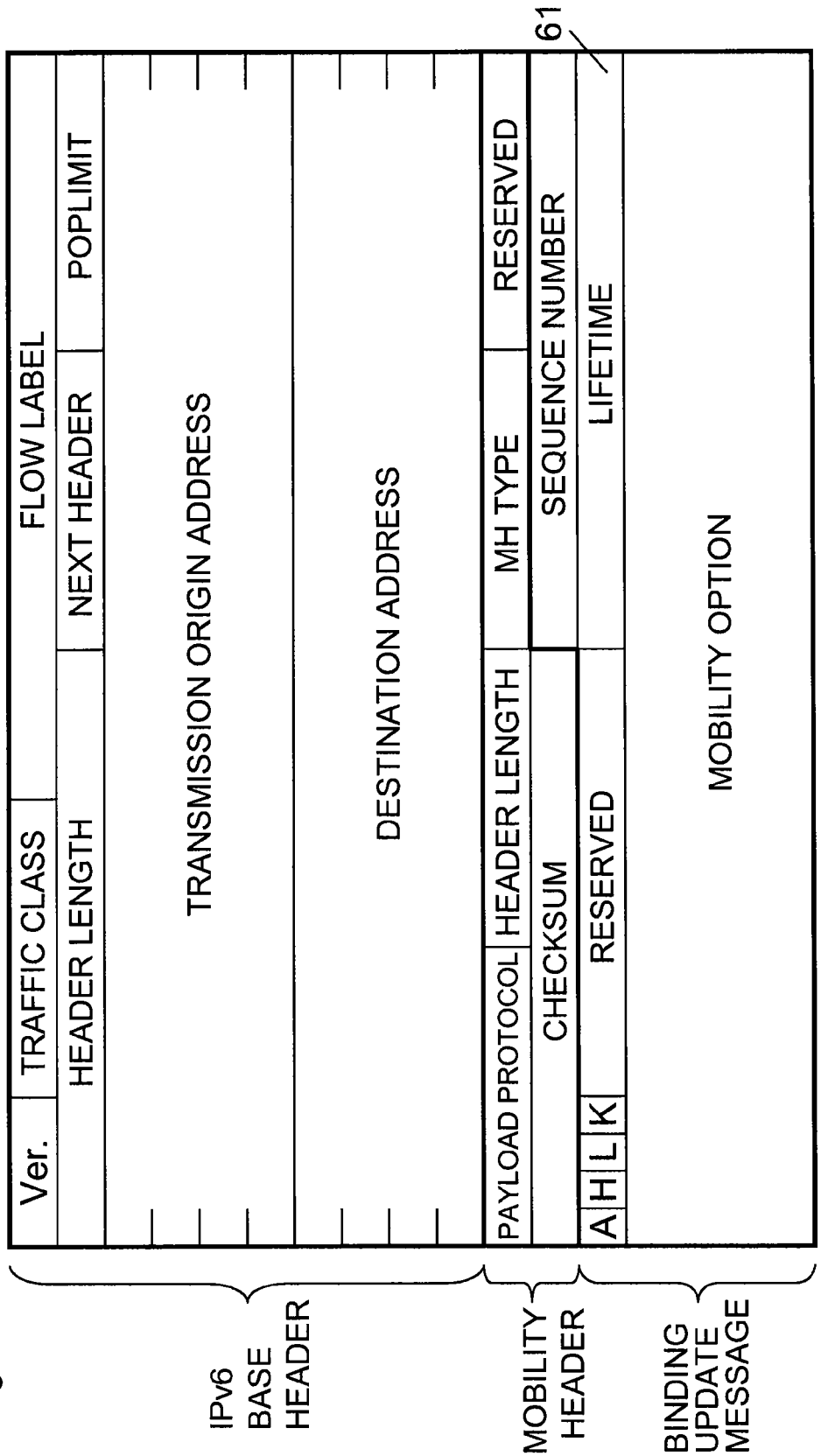
FIG. 6 is a chart showing a format of a binding-update message according to Embodiment 1 of the invention.

On the other hand, when there is a CN to which route optimization is applied, the mobile IP processing part 44 sends a BU message which includes the home address HoA of the mobile communication apparatus 11 itself and the current care-of address CoA1 and in which the lifetime field is set to "0", to the correspondent nodes in which the registration cancellation processing flag 1105 is ON, according to the priority order 1106 (step S503). The BU message is shown in FIG. 6. A lifetime field 61 indicates the valid period in which the mobile communication apparatus 11 which has sent the BU message can directly communicate with the correspondent node 12 of the transmission destination using the current care-of address. The indication of "0" of the lifetime field 61 means that the mobile communication apparatus 11 makes the direct communication with the correspondent node 12 using the current care-of address invalid.

Next, the lower layer processing part 41 performs the handover in the lower layer (step S504).

Next, the mobile IP processing part 44 receives a RA message from the AR15, and generates a care-of address CoA2 from a subnet prefix included in the RA message (step S505).

Next, the mobile IP processing part 44 sends the BU message including the home address HoA of the mobile communication apparatus 11 itself and the care-of address CoA2 to a home agent HA13 (step S506).

The above is the operation when the handover is detected at the time of movement performed by the mobile communication apparatus 11. It is also possible that another list in which address of the correspondent node is combined with the registration cancellation processing flag, and the priority order is stored and referred to instead of the BU list comprising the registration cancellation processing flag and the priority order. Or, it is effective that correspondent nodes are listed in the order of high priority in the BU list, and the registration canceling processing is performed in accordance with this order.

Note that the above registration cancellation processing flag and the priority order are not essential features, and it is also possible that the registration cancellation processing can be performed on all the correspondent nodes registered in the BU list.

Figure 5:
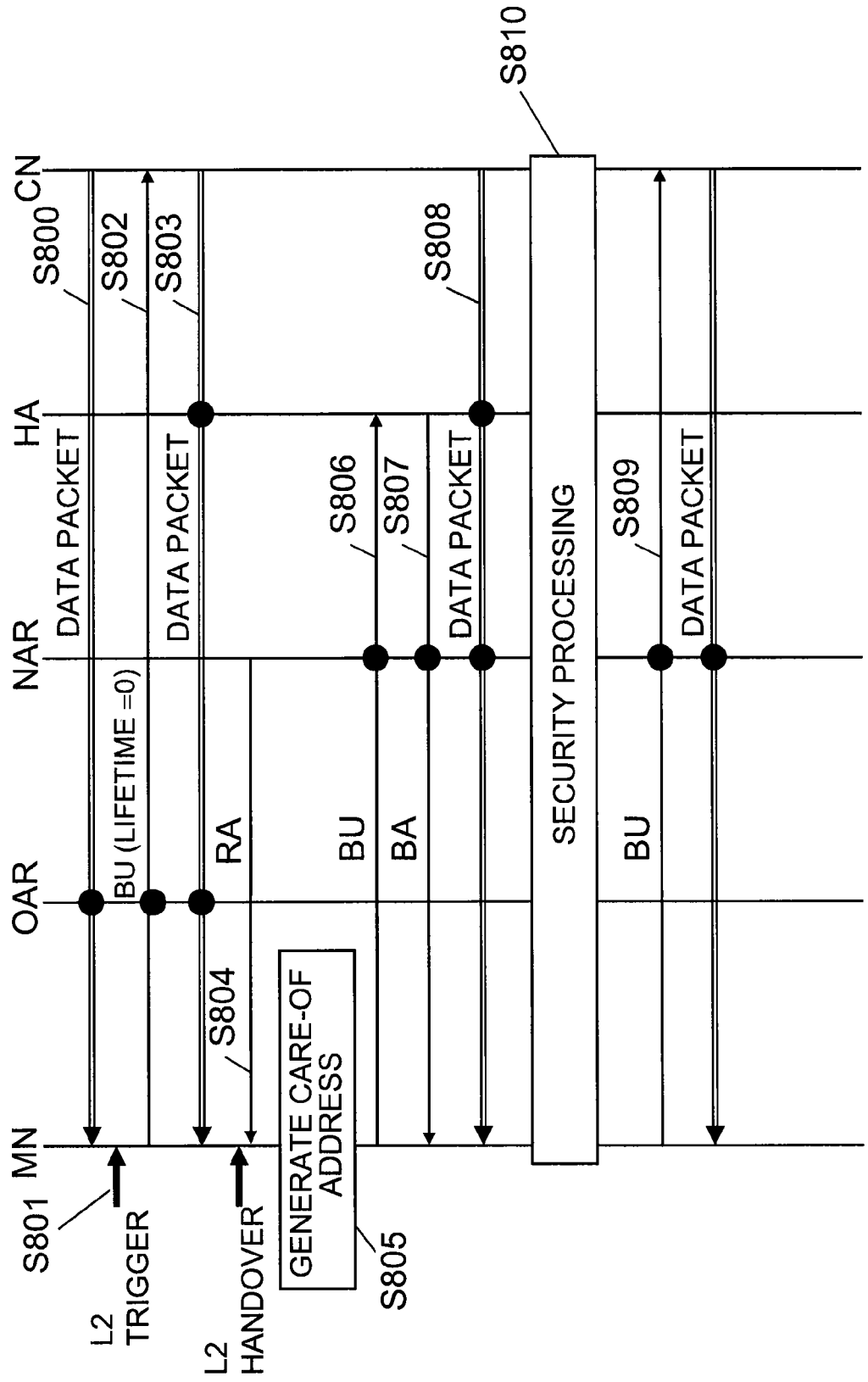
FIG. 5 is a sequence diagram showing an operation of the mobile communication system according to Embodiment 1 of the invention.
Figure 7:
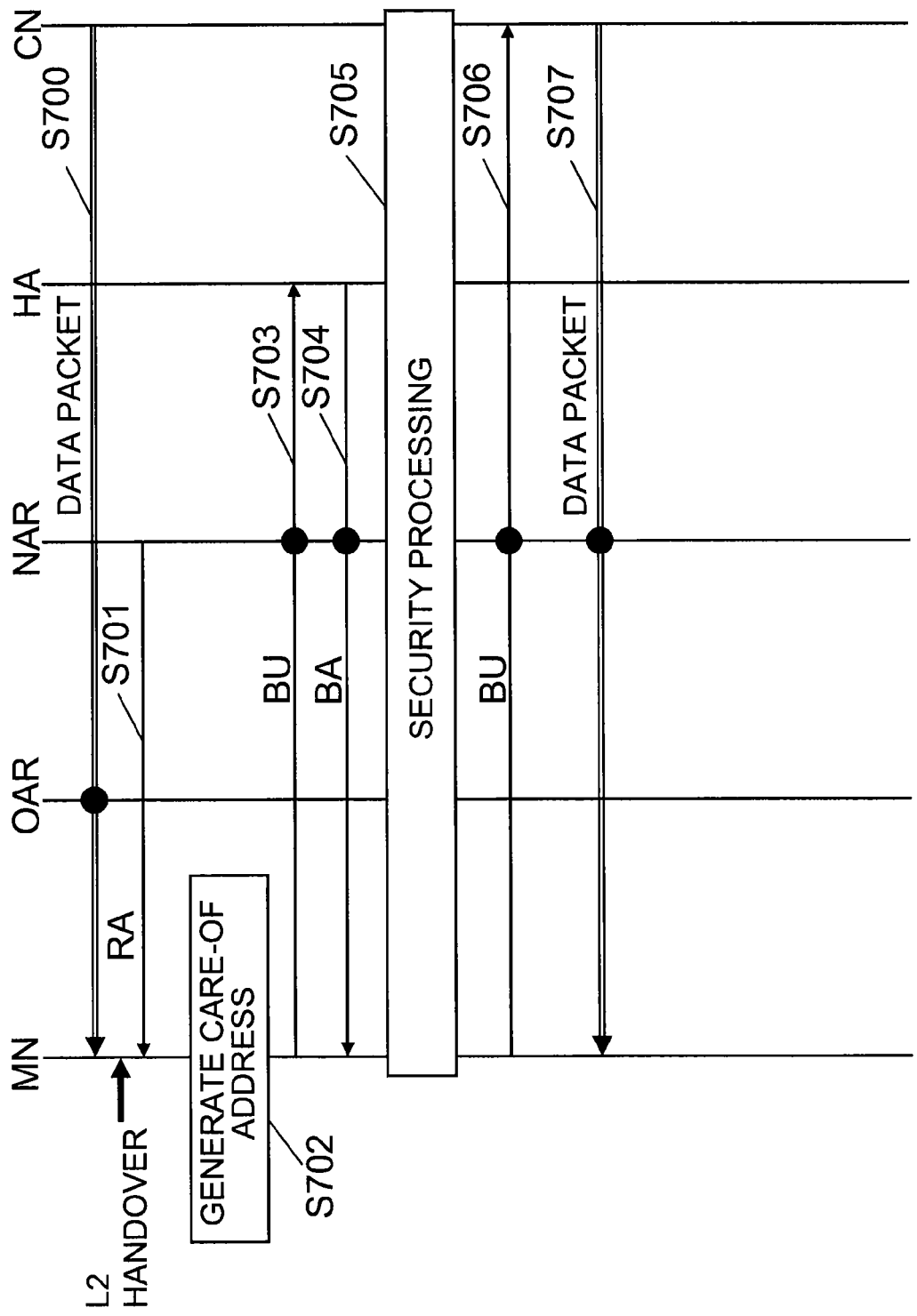
FIG. 7 is a diagram showing a sequence according to a conventional mobile IP.

Next, the operation when the handover takes place in the mobile communication system of the embodiment will be explained with reference to the sequence diagram of FIG. 5. The operation up until the mobile communication apparatus 11 is connected to an AR14 and performs the route optimization with the correspondent node 12 is same as the conventional example shown in FIG. 7; namely, data packets addressed to the mobile communication apparatus 11 from the correspondent node 12 are directly transmitted to the mobile communication apparatus MN11 through the AR14 (step S800).

First, the mobile communication apparatus MN11 moves, and detects a trigger from an access router AR15 different from the currently connected access router 14 (step S801), and determines the access router AR15 to be the handover destination. The mobile communication apparatus MN11 performs the registration cancellation processing, and sends the BU message to the correspondent node CN12 (step S802). The correspondent node CN12, after receiving the BU message from the mobile communication apparatus MN11, checks whether the lifetime field 61 is set to "0". In the case that the lifetime field 61 is set to "0", the correspondent node CN12 cancels the entry in the keeping binding cache whose home address matches the home address HoA of the mobile communication apparatus MN11. In the case that the lifetime field 61 is not "0", the correspondent node CN12 performs a normal registration processing. These processings of the correspondent node CN12 are standard mobile IP processings.

After that, packets transmitted from the correspondent node CN12 and addressed to the mobile communication apparatus MN11 are transmitted and addressed to the home address HoA of the mobile communication apparatus MN11. The home agent HA13 intercepts the packets transmitted and addressed to the home address HoA of the mobile communication apparatus MN11, and tunnels them to a care-of address CoA1 managed by the former router AR14 (step S803), in the mobile communication apparatus MN11.

Then, the mobile communication apparatus MN11 performs the handover in the lower layer and receives the RA message from the AR15 (step S804). The mobile communication apparatus MN11 generates a care-of address CoA2 based on the subnet prefix included in the RA message (step S805).

After that, the mobile communication apparatus MN11 sends a BU message including its home address HoA and the care-of address CoA2 to the home agent HA13 (step S806).

The home agent HA13, after receiving the BU message, generates or updates the entry associating the home address HoA of the mobile communication apparatus MN11 with the care-of address CoA2. Then, the home agent HA13 sends a BA message addressed to the mobile communication apparatus MN11 (step S807) The mobile communication apparatus NM11 verifies that the registration is completed by receiving the BA message from the home agent HA13.

After that, packets addressed to the home address HoA of the mobile communication apparatus MN11 are intercepted by the home agent HA and forwarded to the new care-of address CoA2 of the mobile communication apparatus MN11 (step S808).

After that, the mobile communication apparatus MN11 sends a BU message including its home address HoA and the care-of address CoA2 to the correspondent node CN12 (step S809). Note that there is a case where the mobile communication apparatus MN11 performs a procedure for security on the correspondent node CN12 before sending the BU message to the correspondent node CN12 (step S810).

When there are plural entries in the BU list 45 stored by the mobile communication apparatus NM11, the registration cancellation processing is performed on all entries in the same way. In addition, it is also possible that the security procedure in the step S810 and the transmission of the BU message in the step S809 are omitted and all packets are transmitted and received via the home agent.

As described above, in the embodiment, the registration cancellation processing part 46 of the mobile communication apparatus 11 determines whether the route optimization has been applied to the correspondent node 12 registered in the BU list or not, and in the case that the route optimization has been applied, the route optimization is cancelled before performing the handover processing. Accordingly, all data packets to the mobile communication apparatus 11 from the correspondent node 12 are routed via the home agent, therefore, it can be prevented that while the mobile communication apparatus 11 is changing the care-of address and notifying the address to the home agent, a data packet addressed to the mobile communication apparatus is directly delivered to the care-of address before movement so that the packet is lost.

The registration cancellation processing is performed on the nodes where communication frequency with the mobile communication apparatus is high, and therefore the loss of packets from the correspondent nodes with which communication frequency is high can be reduced.

Furthermore, the registration cancellation processing is performed on nodes where a session has been established with the mobile communication apparatus, and therefore a disconnection of the session with the correspondent node due to packet loss can be prevented.

Additionally, the registration cancellation processing is performed on the nodes where an application uses communication between the mobile communication apparatus and the correspondent node which becomes inoperable if there is packet loss, and therefore such an application can be used even at the time of handover.

The cancellation of location registration is executed in the order of priority of correspondent nodes written in the BU list; therefore, when there is insufficient time for sending a registration cancellation message to all correspondent nodes, the possibility that the registration cancellation processing can be performed on the correspondent nodes with high priority can be made higher.

After the mobile communication apparatus MN11 has moved to the new access router AR15, it is effective that the registration processing of the correspondent nodes in the step S809 is performed first with the correspondent nodes in which the registration cancellation processing flag 1105 is set to OFF. In this way, since the registration cancellation processing has not been performed, the correspondent nodes transmitting data packets to the care-of address before movement are informed directly of the movement destination care-of address first, and therefore packet loss can be reduced.

In the embodiment, the access router directly performs wireless communication with the mobile communication apparatus; however, the invention is not limited to the above and it is possible that the access router includes a plurality of access points or wireless base stations, and performs wireless communication with these access points or wireless base stations. In this case, the mobile communication apparatus realizes the same operation and effect by the same processing.

Industrial Applicability

As described above, this invention is effective for a mobile communication apparatus which moves between different subnetworks, and preferable in performing a handover during communication with a correspondent node to which route optimization has been applied according to Mobile IPv6.

The invention claimed is:

1. A mobile communication method, comprising:
   performing location registration of a mobile communication apparatus with a home agent managing the movement of the mobile communication apparatus, through access routers;
   performing the location registration of the mobile communication apparatus with correspondent nodes communicating with the mobile communication apparatus;
   communicating between the mobile communication apparatus and the correspondent nodes via an optimized path that does not include the home agent;
   detecting start of handover of the mobile communication apparatus from a current access router to a new access router;
   determining whether the current access router performs handover processing using fast mobile IP;
   instructing the correspondent nodes to cancel the location registration of the mobile communication apparatus and to begin communicating via the home agent when the detecting step detects the start of handover, and the determining step determines that the access router does not perform handover processing using the fast mobile IP; and
   wherein if the determining step determines that the current access router performs handover processing using fast mobile IP, the correspondent nodes are not instructed to cancel the location registration of the mobile communication apparatus.

2. A mobile communication apparatus being location registered with a home agent, the home agent managing movement of the mobile communication apparatus through access routers, the mobile communication apparatus comprising:
   a registration request part requesting a correspondent node to make a location registration with the mobile communication apparatus, the correspondent node communicating with the mobile communication apparatus via an optimized path that does not include the home agent;
   a list storage part keeping a list of the correspondent nodes which have made location registration;
   a handover detection part detecting the start of a handover of the mobile communication apparatus from a current access router to a new access router; and
   a fast mobile IP detection part determining whether the current access router performs a handover processing using a fast mobile IP;
   wherein when said fast mobile IP detection part determines that the current access router does not perform the handover processing using the fast mobile IP, said request part requests the correspondent nodes in the list to cancel their location registration of the mobile communication apparatus and to begin communicating via the home agent,
   wherein when said fast mobile IP detection part determines that the current access router performs the handover processing using the fast mobile IP, the correspondent nodes are not instructed to cancel the location registration of the mobile communication apparatus.

3. The mobile communication apparatus according to claim 2, wherein the list is a binding update list to which registration cancellation information is added.

4. The mobile communication apparatus according to claim 3, wherein the list further includes priority information indicating the order in which the registration cancellation is performed.

5. The mobile communication apparatus according to claim 4, wherein in the list, the correspondent nodes are listed in the order of high priority.

6. A mobile communication apparatus, comprising:
   a memory; and
   a lower processing section operable to detect a handover of the mobile communication apparatus and trigger an event of the handover to an IP processing section;

wherein the IP processing section includes an binding update section operable to:
  register a binding update to a corresponding node,
  creating an entry for the corresponding node in a binding update list listing a plurality of corresponding nodes to whom a binding update has been made in the memory,
  update or cancel the current binding update stored in the corresponding nodes according to:
    a registration cancellation processing flag indicating whether the registration cancellation processing is performed or not,
    an entry for the node in the binding update list; and
a mobile IP section when the event of the handover is triggered, is operable to:
  obtain an environment of the handover, the environment including a current access router and a next access router in the handover, and
  determine, whether a fast mobile IP procedure, standardized as Mobile IPv6 Fast Handovers, is supported in the environment of the handover, and
  if the procedure is supported, set a registration cancellation processing flag in each entry of the binding update list in the memory to indicate the cancellation processing will not be performed by the binding update section.

7. The mobile communication apparatus, according to claim 6, wherein
the IP processing section is operable to:
  sort the binding update list in the memory according to the communication status of each of the corresponding nodes in the list; and
  cancel the current binding update stored in the corresponding nodes in the order of the list.

* * * * *